United States Patent Office 3,482,770
Patented Dec. 9, 1969

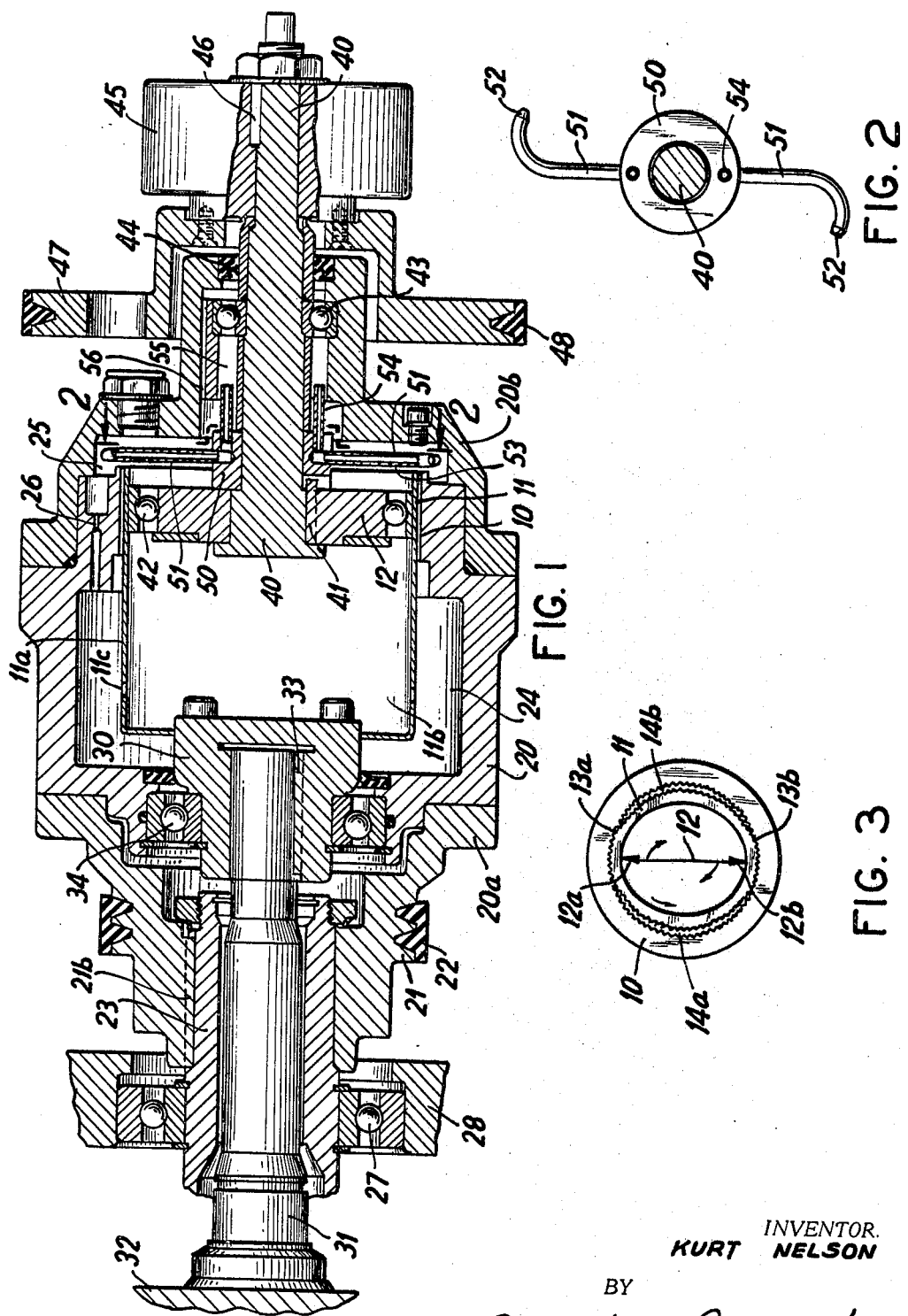

3,482,770
VARIABLE SPEED POWER TRANSMISSION
Kurt Nelson, Wappingers Falls, N.Y., assignor to The De Laval Separator Company, Poughkeepsie, N.Y., a corporation of New Jersey
Filed Apr. 10, 1968, Ser. No. 720,024
Int. Cl. B04b 5/00; F16b 37/00, 35/06
U.S. Cl. 233—7                                7 Claims

ABSTRACT OF THE DISCLOSURE

A so-called harmonic drive comprises three elements, namely, (a) a circular spline which is rigid and toothed to form a gear, (b) a "flexspline" which is toothed to form a non-rigid gear coaxial with the circular spline gear, and (c) a "wave generator" for deflecting the flexspline and causing rotational displacement of engaging and non-engaging portions of the teeth of the respective gears to effect rotation of one gear relative to the other. Two simultaneous power inputs and two simultaneous power outputs are so connected to these three elements that one output is always driven directly with (and thus at the same speed as) the main input element, while another element serves only for an auxiliary input to determine the speed of the third element constituting the other output. Preferably, the arrangement is embodied in a sludge centrifuge wherein the circular spline is the main input element and is directly connected to the rotor, while the wave generator is the auxiliary input element and the flexspline element is directly connected to the screw conveyor (scroll) in the rotor; and the centrifuge has means including a paring disc for lubricating parts of the harmonic drive assembly.

---

This invention relates to so-called harmonic drives and more particularly to such a drive having both a main and an auxiliary power input and through which two loads are adapted to be driven simultaneously, one at the angular speed of the main power input and the other at an angular speed which is a predetermined reduction or increase relative to the angular speed of the auxiliary power input.

Harmonic drives are well known in the art, examples being disclosed in U.S. Patents No. 2,906,143 granted Sept. 29, 1959, and No 3,320,828 granted May 23, 1967. Essentially, such a drive comprises the following three elements:

(a) A circular spline which is toothed and rigid to form a first gear element.

(b) A flexspline forming a second gear element having a different pitch diameter and a different number of teeth than the first element but having teeth of the same circular pitch as the teeth of the first element, this second element having a deflectable wall.

(c) A wave generator which is a lobed strain-inducing element operable to deflect the wall of the second gear element and to maintain it deflected with its teeth engaging the teeth of the first gear element in at least two angularly spaced positions interspaced by positions at which the teeth are not engaged, the number of these teeth-engaging positions corresponding to the number of lobes on the wave generator.

Typically, the circular spline is fixed and surrounds the flexspline which is the rotating output element, and the latter in turn surrounds the wave generator which is the input element rotated by a power source. The flexspline, being of smaller circumference than the circular spline, has fewer teeth; and the difference in the number of teeth on these two elements is a multiple of the number of lobes on the wave generator. As the wave generator is rotated clockwise, for example, it transfers to the flexspline a wave form which continuously moves in the same direction, thereby causing the flexspline to rotate in the opposite direction at an angular speed which is a certain fraction of the angular speed of the wave generator. The reduction ratio of these two speeds is determined by dividing the aforesaid difference in the number of teeth by the number of teeth on the rotating output element (flexspline). For instance, if the fixed circular spline has 104 teeth and the flexspline has 100 teeth, it will require 25 revolutions of the wave generator to rotate the flexspline through one complete revolution, with a corresponding mechanical leverage.

If the flexspline is held against rotation and the circular spline is used as the output element, the latter will be rotated in the same direction as the wave generator constituting the input element. A speed reduction can also be obtained by holding the wave generator against rotation and using the flexspline as the input and the circular spline as the output, the input and output again rotating in the same direction.

Additionally, the harmonic drive can be used as a speed increaser, as by holding the circular spline stationary and using the flexspline and wave generator as the input and output elements, respectively, in which case the latter elements rotate in opposite directions. Alternatively, speed increasing can be obtained by holding the flexspline stationary while using the circular spline and wave generator as the input and output elements, respectively, or by holding the wave generator stationary while using the circular spline and flexspline as the input and output elements, respectively, in which cases the input and output elements rotate in the same direction.

According to the present invention, the principles of the harmonic drive are employed in a novel manner to rotate two loads simultaneously through the drive from two input driving means connected to respective elements of the drive, whereby the angular speed of one load is maintained equal to that of one of the driving means while the other load is driven with a predetermined speed reduction or increase, as compared to the speed of the other driving means, but at an angular speed which is variable under control of the latter driving means.

More particularly, the invention comprises three members mounted for rotation relative to each other about a common axis and to which the harmonic drive's three elements, respectively, are secured for rotation with the respective members coaxially thereof. First and second driving means are connected to first and second of these members, respectively, for rotating them simultaneously but at different angular input speeds to displace the aforesaid teeth-engaging positions rotatively relative to the first gear element (circular spline), thereby causing relative motion between the first and second gear elements about the rotation axis. Because of the gear reduction effect of the harmonic drive, the angular speed of this relative motion is a predetermined fraction of the angular speed of the rotatable member to which the strain-inducing element (wave generator) is secured. First and second loads are connected to and driven by the first member and the third member, respectively, whereby both loads are driven by the first driving means but the second load is driven at an angular speed differing from that of the first load by an amount which is directly proportional to the angular speed of the aforesaid relative motion, and one of the two driving means is adjustable in its driving speed to vary the angular speed of said relative motion.

In a preferred form of the invention as embodied in a sludge centrifuge, the circular spline (first gear element) is driven from the first driving means as the primary power input and is connected through the corresponding first rotatable member to the first load constituted by the centrifugal rotor; the flexspline (second gear element) is connected through the corresponding rotatable member to the second load constituted by the sludge-conveying screw (scroll) rotatably mounted in the rotor; and the strain-inducing element (wave generator) is adapted to be driven from the second driving means as an auxiliary drive provided with means for changing both the direction and speed of this drive. Thus, with the auxiliary drive inactive so as to hold the strain inducing element stationary, the conveyor screw will be driven in the same direction as the centrifugal rotor but at a speed greater than that of the rotor by a relatively small increment which is dependent upon the gear reduction ratio of the harmonic drive; and this increment is reduced as the auxiliary drive is operated at higher speeds in the same direction of rotation as the primary driving means and the circular spline. Conversely, this increment is increased as the auxiliary drive is operated at higher speeds in the reverse direction of rotation. In this way, the length of time during which the sludge particles are subjected to centrifugal action in the rotor can be closely controlled.

In this preferred embodiment of the invention, the rotatable member secured to the circular spline is a hollow body forming an oil reservoir and a paring chamber; and by means of a paring device located in this chamber and rotatable with the strain-inducing element, oil from the reservoir is circulated through bearings of the assembly and back to the reservoir.

For a more complete understanding of the invention, reference may be had to the following detailed description in conjunction with the accompanying drawing, in which:

FIG. 1 is a longitudinal sectional view of a preferred embodiment adapted for driving the rotor and conveyor screw of a sludge centrifuge;

FIG. 2 is a sectional view on line 2—2 of FIG. 1, showing the paring device and its mounting, and FIG. 3 is a schematic view of a typical harmonic drive, showing its three standard elements.

Referring first to FIG. 3, the circular spline of a conventional harmonic drive is shown at 10, and the flexspline and the wave generator (strain-inducing element) are indicated at 11 and 12, respectively. The wave generator is shown with two diametrically opposed lobes 12a and 12b which provide two angularly spaced positions 13a and 13b where external teeth of the flexspline 11 engage internal teeth of the circular spline 10. These teeth-engaging positions are interspaced by positions 14a and 14b where the teeth are not engaged. Assuming that the circular spline 10 is held stationary, rotation of wave generator 12 in the clockwise direction, for example, will rotate the teeth-engaging positions 13a and 13b in the same direction and at the same speed, thereby causing the flexspline 11 to rotate in the opposite direction (counterclockwise) but at a greatly reduced speed, as previously explained.

Generally, the wave generator 12 includes a set of ball bearings through which the flexspline 11 is deflected by the lobes 12a–12b as the wave generator is rotated.

Referring now to FIG. 1, the circular spline 10 constituting the first gear element is secured to a first hollow member 20 having an extension 20a forming a sheave 21. Through a belt 22, the sheave 21 is connected to a main driving motor (not shown) for rotating the first gear element 10. The extension 20a closely surrounds and is keyed to a hollow trunnion 23 forming part of the rotor of a sludge centrifuge. The centrifugal rotor 23 constitutes a first load driven from the primary driving means or power input 22 through key 21b, this driving means also serving to drive the first gear element 10 of the harmonic drive at the same angular speed and in the same direction as the centrifugal rotor 23.

The hollow member 20 forms an oil reservoir 24; and at its end opposite the extension 20a, the member 20 has another extension 20b forming a paring chamber 25. The latter communicates with reservoir 24 through a passage 26 in member 20.

The flexspline 11 forming the second gear element has external teeth coacting with the internal teeth of the circular spline 10, as previously explained. This flexspline 11 constitutes part of a hollow member 11a secured to a collar 30 closely surrounding a shaft 31 of the conveyor screw of the sludge centrifuge, the conveyor screw or scroll being partly shown at 32. As will be apparent to those skilled in the centrifugal art, the conveyor screw 32 is located in the separating chamber (not shown) of the centrifugal rotor 23, where it is rotated relative to the rotor for the purpose of conveying separated sludge to the usual sludge outlet (not shown). The conveyor screw 32 constitutes a second load driven from the flexspline 11–11a through collar 30 and key 33. The screw shaft 31 extends through the hollow trunnion 23 of the centrifugal rotor, and bearing means 34 are provided between the collar 30 and the surrounding portion of hollow member 20. Bearing means 27 are also provided between the rotor trunnion 23 and the surrounding part 28 of the stationary casing which houses the rotor.

The wave generator 12 of the harmonic drive is mounted on a shaft 40 and driven thereby through a key 41, and it includes the usual bearing means 42 through which the lobes 12a–12b (FIG. 3) act upon the flexspline 11 to deflect its flexible wall. The shaft 40 is mounted for rotation coaxially of the circular spline 10 and the flexspline 11 by bearing means 43 provided between shaft 40 and the surrounding part of extension 20b. Between the end of the latter extension and shaft 40 are sealing means 44 to prevent escape of oil, as will be apparent presently. The outer end portion of shaft 40 is closely received by a circular member 45, which drives the shaft through key 46. A sheave 47 is secured to member 45 and driven by belt 48 from an auxiliary motor or power source (not shown) provided with means (not shown) for changing both the speed and the direction of rotation of the drive. Thus, the belt 48 may be considered as an auxiliary driving means for rotating the wave generator 12 at variable speeds in either direction.

A collar 50 on the wave generator shaft 40 has a slot which receives part of the key 41, whereby this collar rotates with shaft 40. Collar 50 carries paring means comprising two diametrically opposed paring tubes 51 having their paring edges 52 (FIG. 2) located in the paring chamber 25. In normal operation, the circular spline 10 and hence the paring chamber 25 are rotated by the primary driving means 22 at a substantial angular speed in one direction relative to shaft 40 and its paring tubes 51; and the paring edges 52 of these tubes are so directed in relation to this direction that they pare oil from the paring chamber 25. Some of the pared oil is discharged from outlets 53 of the paring tubes to the bearing means 42, this oil then entering the space 11b in the hollow flexspline 11–11a and returning to reservoir 24 by way of openings 11c in the annular wall of the flexspline part 11a. Another part of the pared oil from chamber 25 is discharged from tubes 51 through respective passages in collar 50 and respective tubes 54 on the collar to the bearing means 43, by way of an annular space 55 between shaft 40 and the surrounding part of extension 20b. From bearing means 43, the oil flows through a passage 56 in extension 20b and returns under centrifugal force to the paring chamber 25.

It will be understood that the pared oil delivered to the bearing means 42 and 43 is returned under the action of centrifugal force to the paring chamber 25, partly by way of passage 26 from the oil reservoir 24 and partly by way of passage 56 leading from the bearing means 43. As shown, the paring chamber 25 is located at a greater radius from the rotation axis than the bearing means 42–43. When operation of the sludge centrifuge is stopped by stopping the driving means 22 and 48, most of the oil drains back into the annular reservoir 24 by way of openings 11c and passage 26, of which several may be spaced about the common rotation axis of the several rotating parts.

In the operation of the sludge centrifuge through the harmonic drive 10, 11 and 12, let it be assumed that the circular spline 10 and the flexspline 11 have 242 and 240 teeth, respectively, meaning that 120 revolutions of the wave generator 12 are needed to effect 1 revolution of the flexspline 11 when the circular spline 10 is held stationary (242 less 240 equals 2, and 2/240 equals 1/120). Let it also be assumed that for optimum centrifugal separation of solids from the particular mixture being fed continuously to the centrifuge, the desired centrifugal force and retention time of the solids in the centrifugal rotor can be obtained if the rotor 23 is rotated at 5600 r.p.m. While the conveyor screw 32 is rotated at 5630 r.p.m. in the same direction as the rotor. If the wave generator 12 were held stationary (the auxiliary drive 48 is idle) while the primary drive 22 is operated at 5600 r.p.m., the conveyor screw 32 would be rotated at about 5646 r.p.m. in the same direction as the rotor (5600 plus 5600/120), giving the solids too short a retention time in the rotor. Hence, in order to provide the desired retention time (5630 r.p.m. of the conveyor screw), it is necessary to reduce the conveyor screw speed by 16 r.p.m. (46 less 30). This reduction can be effected by operating the auxiliary driving means 48 to rotate wave generator 12 at 1920 r.p.m. in the same direction as the rotation of the primary drive 22 and the circular spline 10 (16 multiplied by 120 equals 1920).

On the other hand, let it now be assumed that with the same numbers of teeth and the same 5600 r.p.m. of the rotor 23, the mixture being separated is such that optimum separation of solids is obtained with 5651 r.p.m. of the conveyor screw 32. In that situation, the revolutions per minute of the conveyor screw must be increased by 5 r.p.m. over the 5646 r.p.m. at which it would be rotated when the auxiliary drive 48 and wave generator 12 are held stationary. To obtain this increase, the auxiliary drive 48 is operated to rotate wave generator 12 in the direction opposite to that of the rotation of primary drive 22 and circular spline 10, and at a speed of 600 r.p.m. (5 times 120 equals 600).

Accordingly, in this preferred embodiment of the invention, the retention time of the solids in the centrifugal rotor 23 can be closely and accurately controlled over a wide range by means of the auxiliary drive 48, which is reversible as well as adjustable in its angular speed.

It will be understood that in accordance with the invention generally, the firset load 23 and the second load 32 are directly connected, respectively, to two of the three elements 10, 11 and 12 of the harmonic drive; the primary input drive 22 is directly connected to one of these two elements and the first load; the adjustable auxiliary drive 48 is directly connected to the third element; and the rotational speed of the second load is determined by the rotational direction and speed of the adjustable drive 48. Of course, when both drives 22 and 48 are operated to rotate their respective elements of the harmonic drive in the same direction and at the same angular speed, the two loads 23 and 32 are rotated in the same direction and at the same angular speed, since in that case there is no relative motion between the two gear elements 10 and 11 and the wave generator 12.

I claim:
1. The combination of a first gear element having teeth, a second gear element having a different pitch diameter and a different number of teeth than said first element but having teeth of the same circular pitch as the teeth of said first element, said second gear element having a deflectable wall, a strain-inducing element operative to deflect the second gear element and to maintain it deflected with its teeth engaging the teeth of the first gear element in at least two angularly spaced positions interspaced by positions at which the teeth are not engaged, three members mounted for rotation relative to each other about a common axis and to which said three elements, respectively, are secured for rotation with the respective members coaxially thereof, first and second driving means connected to first and second of said members, respectively, for rotating them simultaneously but at different angular input speeds to effect displacement of said positions rotatively relative to the first gear element and thereby propagate a strain wave along said deflectable wall to cause relative motion between the first and second gear elements about said axis, said elements having a gear reduction effect such that the angular speed of said relative motion is a predetermined fraction of the angular speed of the rotatable member to which the strain-inducing element is secured, and first and second loads connected to and driven by said first member and the third member, respectively, whereby both loads are driven by the first driving means but the second load is driven at an angular speed differing from the angular speed of the first load by an amount which is directly proportional to the angular speed of said relative motion, said second driving means being adjustable in its angular speed of rotation to vary the angular speed of said relative motion.

2. The combination according to claim 1, in which said first member is the member to which said first gear element is secured, said second member being the member to which said strain-inducing element is secured, said adjustable second driving means being operatively connected to the second member and strain-inducing element.

3. The combination according to claim 1, in which said second driving means is reversible as well as adjustable in its angular speed of rotation.

4. The combination according to claim 3, in which said first and third members are concentric shafts, said first load being a centrifugal rotor forming part of a sludge centrifuge and connected to the outer of said concentric shafts, said second load being a conveyor screw mounted in the rotor and positively connected to the inner of said shafts, said screw being operable to discharge separated sludge from the rotor.

5. The combination according to claim 1, in which said first member is a hollow body containing said second gear element and to which said first gear element is secured, said second gear element being hollow to form an inner space containing the strain-inducing element, the combination also comprising bearing means located in the inner space and through which said strain-inducing element is operable to effect said deflection of the second gear element, said second driving means including a drive shaft extending into the hollow body coaxially thereof and secured to the strain-inducing element, second bearing means located in the hollow body and providing bearing support between said body and drive shaft, the hollow body forming a paring chamber and also forming an annular space for containing oil and for supplying oil to said paring chamber, and a paring device rotatable with said drive shaft and operable to pare oil from the paring chamber, the paring device having outlets for delivering oil to said two bearing means, there being passages for returning the delivered oil to said paring chamber under the action of centrifugal force.

6. The combination according to claim 1, in which said first member is a hollow body containing said second gear element and to which said first gear element is secured, said second gear element being hollow to form an inner space containing the strain-inducing element, the combination also comprising bearing means located in the inner space and through which said strain-inducing element is operable to effect said deflection of the second gear element, said second driving means including a drive shaft extending into the hollow body coaxially thereof and secured to the strain-inducing element, the hollow body forming a paring chamber and an oil reservoir for supplying oil to said paring chamber, and a paring device operable to pare oil from said paring chamber and to deliver pared oil to said bearing means, said bearing means communicating with the oil reservoir.

7. The combination according to claim 6, in which said second driving means is reversible as well as adjustable in its angular speed of rotation.

References Cited

UNITED STATES PATENTS

| | | | |
|---|---|---|---|
| 2,734,681 | 2/1956 | Schmiedel | 233—7 |
| 2,867,378 | 1/1959 | Harlow | 233—7 |
| 2,983,162 | 5/1961 | Musser | 74—640 |
| 3,058,372 | 10/1962 | Robinson | 74—640 |
| 3,161,081 | 12/1964 | Musser | 74—640 |
| 3,282,497 | 11/1966 | Schmiedel | 233—7 |

ARTHUR T. McKEON, Primary Examiner

U.S. Cl. X.R.

74—640, 665